A. J. ROBINSON.
Water-Filter.
No. 133,488. Patented Nov. 26, 1872.
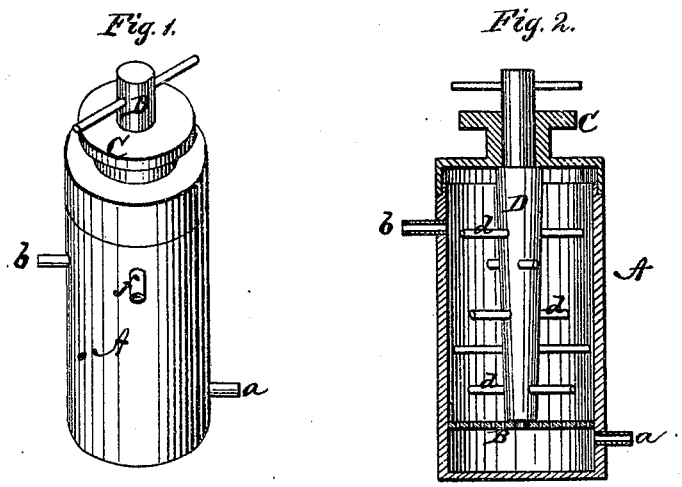
Witness:
Henry N. Miller
C. L. Evert
Inventor.
Andrew J. Robinson.
per
Alexander T. Mason.
Attorneys.

UNITED STATES PATENT OFFICE.

ANDREW J. ROBINSON, OF TROY, NEW YORK.

IMPROVEMENT IN WATER-FILTERS.

Specification forming part of Letters Patent No. 133,488, dated November 26, 1872.

*To all whom it may concern:*

Be it known that I, ANDREW J. ROBINSON, of Troy, in the county of Rensselaer and in the State of New York, have invented certain new and useful Improvements in Water-Filter; and do hereby declare that the following is a full, clear, and exact description thereof, reference being had to the accompanying drawing and to the letters of reference marked thereon making a part of this specification.

The nature of my invention consists in an agitator placed within a water-filter for the purpose of stirring up and shaking the filtering material, so that, with the movement of the water, all impurities can be separated and removed therefrom and from the filter without taking the top off or removing the filtering material.

In order to enable others skilled in the art to which my invention appertains to make and use the same, I will now proceed to describe its construction and operation, referring to the annexed drawing, in which—

Figure 1 is a perspective view, and Fig. 2 is a vertical section, of my invention.

A represents an air-tight cylinder, made of wood or metal, and provided near its bottom with a false perforated bottom, B, below which is the water-inlet $a$. On the perforated bottom B is placed the filtering material, which extends nearly up to the outlet $b$. This filter is to be placed at any desired point between the source of supply and the exhaust-faucet, the water-pipe being connected with the inlet $a$ and outlet $b$. In the top of the cylinder A is formed or attached a stuffing-box, C, through which passes a shaft, D, having its lower end resting in a socket formed in the perforated bottom B or in the bottom of the cylinder. The shaft D is provided with a number of radiating arms, $d$ $d$, as shown, and at the upper end with a handle or other suitable device for turning the same. $f$ represents the outlet for the dirty water. This outlet, as well as the outlet $b$ for the pure water, should be provided with stop-cocks, so that either may be closed or opened as required.

When the filter is in use the stop-cock in the outlet $f$ should be closed and the water pass out through the outlet $b$ to the exhaust-faucet. When desired to clean the filter the stop-cock in the pure-water outlet $b$ is closed and that in the outlet $f$ opened. The agitator is then revolved, stirring up the filtering material, so that the accumulated dirt will be loosened from the same and pass out with the water while the pressure of water is on.

Having thus fully described my invention, what I claim as new, and desire to secure by Letters Patent, is—

An agitator arranged within an air-tight water-filter to remove the accumulated dirt from the same by agitating the filtering material while the pressure of water is on, as specified.

In testimony that I claim the foregoing I have hereunto set my hand this 14th day of October, 1872.

ANDREW J. ROBINSON.

Witnesses:
A. E. WOOSTER,
WM. A. NUMAN.